May 19, 1931.  C. W. KUHN  1,805,491
MOTOR CONTROLLER
Filed May 26, 1928
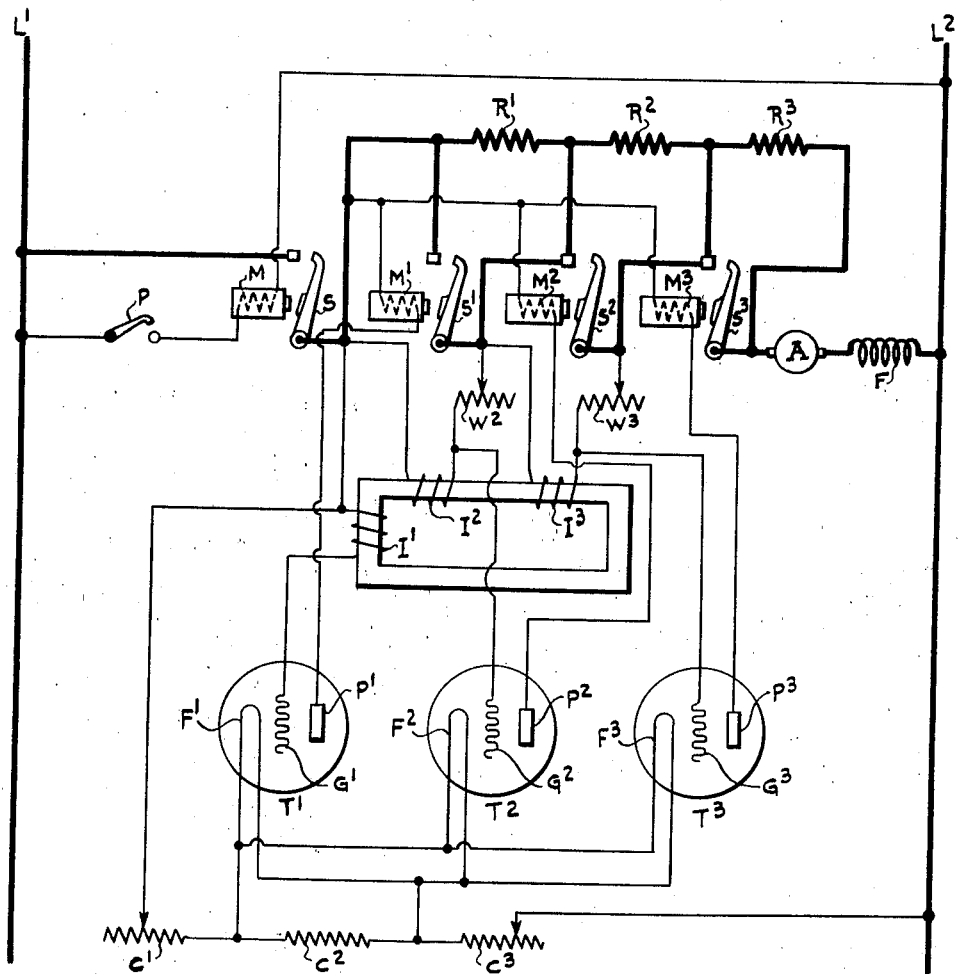
INVENTOR
Clarence W. Kuhn.
BY
ATTORNEY Patented May 19, 1931

1,805,491

UNITED STATES PATENT OFFICE

CLARENCE W. KUHN, OF NORTH MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

MOTOR CONTROLLER

Application filed May 26, 1928. Serial No. 280,759.

This invention relates to controllers for dynamo electric machines and other apparatus.

More particularly the invention relates to controllers for excluding resistance or other current limiting means from the circuit of the controlled machine subject to inductive delay.

An object of the invention is to provide a controller of the aforementioned character employing simple shunt solenoid operated switches which may have the same design characteristics for all voltages of the supply circuit, for the gradual elimination of the resistance.

Another object in the use of an inductor winding for controlling electronic means having a minimum size for a given controller and employing identical windings for all motors of a given operating voltage.

Another object is to reduce the amount of energy which is required for actuation of the control means.

Another object is the use of electronic means of a minimum size and capacity for the work to be performed.

Another object is to improve the sensitivity of response of the controller to the starting conditions of the machine.

The attached drawing illustrates one embodiment of the invention which will be described hereafter. It will be understood, however, that this embodiment may be modified in various ways without departure from the scope of the appended claims.

The drawing illustrates diagrammatically a controller for a motor.

The controller illustrated controls a direct current motor including an armature A and a series field winding F. The motor, of course, may be of any other preferred type. The controller includes an electromagnetic main switch M for connecting the motor circuit across the lines $L^1$, $L^2$, and electromagnetic accelerating switches $M^1$ to $M^3$ for controlling the starting resistances $R^1$ to $R^3$, respectively, in series with the motor. The accelerating switches include switch members $S^1$ to $S^3$, respectively, which are moved to their circuit closing positions when the corresponding operating windings $M^1$ to $M^3$ are sufficiently energized. A manually operated switch P is provided for connecting the operating coil of the main switch M across the lines $L^1$ and $L^2$.

When main switch M closes it connects one side of the coil of each of accelerating switches $M^1$ to $M^3$ to the positive line $L^1$ thereby completing circuits through these coils to plates $P^1$ to $P^3$ of the thermionic tubes $T^1$ to $T^3$. The filaments of said tubes are connected across the resistance $C^2$ which is in series with the adjustable resistances $C^1$ and $C^3$ across the lines $L^1$ and $L^2$. The potential of the filaments with respect to the plates is determined by the relative value of the resistances $C^1$, $C^2$ and $C^3$ and may be varied by adjustment of the resistances $C^1$ and $C^3$. Hence when a sufficent current passes between the plates and the filament of the tubes the respective coils of the accelerating switches are energized to close their contacts, thereby short-circuiting the corresponding starting resistances $R^1$ to $R^3$.

The grids $G^1$ to $G^3$ of the thermionic tubes $T^1$ to $T^3$ are connected in circuits including the inductor windings $I^1$ to $I^3$, certain of said circuits also including the adjustable resistances $W^2$ and $W^3$. The potential induced in the inductor windings by the variation of the main motor current is impressed upon the grids and this potential is a function of the rate of change of the current in the inductor windings.

As the grids $G^1$ to $G^3$ are connected to points of the circuit the potential of which becomes progressively less negative with respect to the filaments $F^1$ to $F^3$ the proper sequence of operation of the accelerating switches is assured. For instance, with the main switch open and no current flowing grid $G^1$ has the negative potential of line $L^2$ whereas the filament $F^1$ has a potential intermediate of the potential of the positive line $L^1$ and the negative line $L^2$, this potential being dependent upon the adjustment of the resistances $C^1$ and $C^3$. When the line switch S closes the potential of the grid $G^1$ becomes that of the line $L^1$ so that the grid $G^1$ would be positive with respect to filament $F^1$, except for the transient potential which is induced in the inductor $I^1$, and which will be described in detail further on. Similarly, when the line switch S is open the grid $G^2$ has the potential of line $L^2$ and is therefore negative with respect to the filament $F^2$. When the line switch S closes the grid $G^2$ receives from the line a potential which is equal to a potential of the plus line $L^1$ minus the voltage drop determined by the resistor $R^1$ and the inductor $I^2$ and resistance $W^2$ to which potential is superposed the transient voltage due to the sudden rush of current passing through the motor circuit and the parallel branch $R^1$ and $W^2$. The potential of the grid $G^3$ varies in a similar manner.

The controller functions as follows:

When the manually operated control switch P is closed it establishes a circuit for the magnet of the main switch M across the lines $L^1$ and $L^2$. The magnet is thereby energized and closes the contact S of the main switch, thereby connecting the motor armature A and field F across the lines $L^1$, $L^2$ in series with the starting resistances $R^1$ to $R^3$. A fraction of the motor current passes through the inductor windings $I^2$ and $I^3$ which in series with the respective resistances $W^2$ and $W^3$ are in parallel with the respective resistances $R^1$ and $R^2$. These shunt currents induce a magnetic flux in the iron circuit of the inductance T and the flux in turn induces a voltage in the inductor winding $I^1$ in such a direction that the negative potential of the grid $G^1$ of tube $T^1$ with respect to the filament $F^1$ gradually decreases until the motor current due to the acceleration of the armature has reached a substantially constant value so that the induced electromotive force in the inductor $I^1$ approaches zero when the potential of the grid $G^1$ becomes positive with respect to the filament $F^1$.

Closure of the main switch S also completes a circuit through the resistances $C^1$, $C^2$ and $C^3$ of the thermionic tubes $T^1$ to $T^3$, thereby permitting a current to pass also through the filaments $F^1$, $F^2$ and $F^3$ for heating thereof. The drop in voltage through the resistance $C^1$ also produces a potential difference between the plates $T^1$, $T^2$ and $T^3$ and the filaments, as the potential of the plates is that of the line $L^1$.

As stated above, when the current in the motor circuit approaches a constant value the negative potential impressed upon the grid $G^1$ approaches zero or becomes positive. This causes a current flow between the plate and the filament and when a sufficiently high value is reached by this current it causes the magnet $M^1$ to close its associated switch contact $S^1$ thereby short-circuiting the starting resistance $R^1$ and increasing the starting current of the motor.

Upon closure of $S^1$ the inductor $I^2$ and the resistance $W^2$ in series therewith are also short-circuited to form a closed loop. The short-circuit current passing through the circuit maintains the negative potential which the grid $G^2$ possessed with respect to the filament $F^2$ until this current has died down to a value approaching zero. As the potential of the grid $G^2$ becomes less negative or positive due to the decrease of the short-circuit current the current which tends to flow between the filament $F^2$ and the plate $T^2$ becomes sufficient to energize the magnet coil $M^2$ to close its associated contact $S^2$ thus short-circuiting the starting resistance $R^2$ and also short-circuiting the inductor winding $I^3$ in series with the resistance $W^3$. The short-circuiting of the resistance $R^2$ again increases the motor current temporarily and also produces a transient potential on the grid $G^3$ as has been described above with respect to the grid $G^2$. Hence after a certain lapse of time the tube $T^3$ passes a sufficient current between the filament $F^3$ and the plate $P^3$ to cause the magnet winding $M^3$ to short-circuit its associated contacts $S^3$, thereby cutting out the last step of starting resistance and bringing the motor up to full speed.

It will be understood that the initial negative potential on the respective grids is dependent upon the potential existing at the point of the starting resistor to which the respective grid is connected and as the initial voltage at these points of the starting resistor becomes increasingly negative for the respective tubes $T^1$ to $T^3$ the operation of the tubes and thus of the accelerating switches in the proper order is assured.

The instantaneous value of the negative potential of the respective grid after the short-circuiting of the corresponding impedance and hence the time required for the grid to acquire the desired potential depends upon the current which flows through the correlated step of resistance prior to the short-circuiting thereof, as this current also determines the branch current going through the inductor and the associated series regulating resistance.

A further delay in the operation of the respective accelerating switches is due to the inductance of the windings of the coils $M^1$ to $M^3$. Thus the delay or time lag may be regulated by a suitable design of the impedance of the coil circuits and a further regulation may be obtained by the adjustment of the regulating resistances $C^1$ and $C^3$ as described heretofore.

It will thus be seen that the motor is regulated in accordance with the rate of change of the current in the motor circuit and a definite regulable time element.

What I claim as new and desire to secure by Letters Patent is:

1. In a motor controller, in combination, accelerating means and means having an inherently transient effect to arrest accelerating operation of the former means in different stages thereof, subject to control by the electrical conditions of the motor circuit, the second mentioned means including a plurality of electronic valves and a plurality of cooperating windings arranged in a mutually inductive relation and each connected in shunt across different parts of the motor circuit.

2. In a motor controller, the combination with accelerating switches to be operated in sequence, said switches having coils subjected to control by electronic valves, of electronic valves and of windings arranged in a mutually inductive relation to supply transient currents to said valves and commutatable connections for said windings providing for inclusion of all of said windings in said motor circuit upon completion of the latter and for progressive exclusion of said windings from the motor circuit upon sequential closure of said accelerating switches.

3. In a motor controller, in combination, accelerating means and means to arrest for temporary periods the accelerating action of the former means in different stages thereof, the latter means including windings and electronic valves, said windings being arranged in mutually inductive relation and connected in shunt across different parts of the motor circuit, and commutatable connections therefor to cause each winding to act upon said valves by induction in successive stages of acceleration to arrest the accelerating operation.

4. In combination, with an electric motor having a resistor associated therewith, of a plurality of switches for controlling said resistor, each of said switches having a winding associated therewith which is connected in circuit with an electronic valve, the one electrode of which is connected across a portion of said resistor and an inductive winding connected in series with said electrode of said valve, said inductive windings being arranged in a mutually inductive relation.

5. In combination, with an electric motor having a resistor associated therewith, of a plurality of electroresponsive switches having a winding associated therewith which is connected in series with an electronic valve, said valve being provided with a control electrode and an inductor having a plurality of like coils connected in shunt with portions of said resistor and arranged in a mutually inductive relation and each connected in series with the control electrode of one of said valves.

6. In combination, with a circuit including a resistor of means for excluding said resistor from said circuit and electronic means to effect arrest of the action of the former means in different stages thereof, said electronic means including an inductive device having a plurality of coils arranged in a mutually inductive relation and permanently connected in shunt across different parts of said resistor and electronic valves connected to said coils to be rendered responsive to the varying current of an inherently transient effect to thereby control the resistor excluding means.

7. In combination with an electric motor of accelerating units therefor affording starting resistance for the motor, said units each including an electroresponsive switch operative to accelerate the motor, restraining means for said switch comprising an electronic valve and an inductor coil, the inductor coils of said units being in series with one another and with said motor and being arranged in a mutually inductive relation.

8. In combination, with an electric motor of accelerating units therefor, affording starting resistances for the motor, said units each including an electroresponsive switch operative to accelerate the motor and restraining means for said switch comprising an electronic valve and an inductor winding, the inductor windings of said units being in series with one another and with said motor and being arranged in a mutually inductive relation and the electronic valves of said units being respectively subjected to influence by different inductor windings to thereby control said electroresponsive switches.

9. In a motor controller, in combination, a plurality of starting resistances for the motor to be excluded from circuit sequentially, a plurality of electromagnetic switches each controlling one of said resistances and control means for said switches comprising an electronic valve for each of a plurality of said switches and an energy storage circuit for each valve, said energy storage circuits being in shunt with different parts of the motor circuit and being commutatable sequentially by operation of said switches.

10. In a motor controller, in combination, a plurality of starting resistances for the motor and an accelerating unit for each of a plurality of said resistances, each of said units comprising an electromagnetic switch, an electronic valve to control the same, an impedance in parallel with one of said resistances, and means to cause the discharge of energy stored up in said impedance to vary the impedance of said valve in accordance with variations of the resulting discharge current.

11. In a motor controller, the combination with accelerating switches to be operated in sequence, said switches each having a coil to be subjected to control by an electronic valve, of a plurality of units each including an electronic valve and an impedance to supply transient currents to said valve and commutatable connections for the impedances of said units providing for their inclusion in the motor circuit upon completion of the latter and for their exclusion progressively upon sequential closure of said accelerating switches.

12. The combination with an electric motor, of accelerating units therefor affording starting resistance, said units each including an electroresponsive switch operative to accelerate the motor and restraining means for said switch comprising an electronic valve and an impedance, the impedances of said units being in series with one another and with said motor.

In witness whereof, I have hereunto subscribed my name.

CLARENCE W. KUHN.